(12) United States Patent
Strand

(10) Patent No.: US 9,834,049 B2
(45) Date of Patent: Dec. 5, 2017

(54) SYSTEM AND METHOD FOR CONNECTING OR DISCONNECTING A TRAILER TO A VEHICLE

(71) Applicant: SMART PATENTS AS, Jakobsli (NO)

(72) Inventor: Dag Arild Aamodt Strand, Jakobsli (NO)

(73) Assignee: Smart Patents AS, Trondheim (NO)

( * ) Notice: Subject to any disclaimer, the term of this patent is extended or adjusted under 35 U.S.C. 154(b) by 0 days.

(21) Appl. No.: 14/904,070

(22) PCT Filed: Jun. 19, 2014

(86) PCT No.: PCT/NO2014/050105
§ 371 (c)(1),
(2) Date: Jan. 8, 2016

(87) PCT Pub. No.: WO2015/005795
PCT Pub. Date: Jan. 15, 2015

(65) Prior Publication Data
US 2016/0185169 A1    Jun. 30, 2016

(30) Foreign Application Priority Data

Jul. 11, 2013  (NO) .................................. 20130966

(51) Int. Cl.
*B60D 1/36*     (2006.01)
*B60D 1/62*     (2006.01)
(Continued)

(52) U.S. Cl.
CPC .............. *B60D 1/36* (2013.01); *B60D 1/246* (2013.01); *B60D 1/42* (2013.01); *B60D 1/54* (2013.01); *B60D 1/62* (2013.01); *B60D 1/66* (2013.01)

(58) Field of Classification Search
CPC .............. B60D 1/36; B60D 1/42; B60D 1/54
(Continued)

(56) References Cited

U.S. PATENT DOCUMENTS 2,612,384 A * 9/1952 Wiegman ................. B60D 1/54
                                                    280/491.2
6,000,709 A * 12/1999 Gentner ..................... B60D 1/40
                                                        180/178
(Continued)

FOREIGN PATENT DOCUMENTS

DE   102010004920 A1   7/2011
EP       1535765 B1    4/2006
EP       2602132 A1    6/2013

OTHER PUBLICATIONS

Norwegian Search Report 20130966, Jan. 23, 2014.
International Preliminary Report on Patentability, European Patent Office, Oct. 29, 2015.

*Primary Examiner* — Jacob D Knutson
(74) *Attorney, Agent, or Firm* — Sughrue Mion, PLLC

(57) ABSTRACT

System and method for connecting or disconnecting a trailer (102) to a vehicle (101) comprising a tow bar (201) mounted to the vehicle (101), a trailer hitch mounted on the trailer (102), at least one motor mounted in connection with the tow bar (201), a control of said at least one motor and is further characterized in that said tow bar (201) automatically can connect to the trailer hitch mounted on the trailer (102) when these are within a predetermined radius of one another.

13 Claims, 5 Drawing Sheets

(51) Int. Cl.
*B60D 1/24* (2006.01)
*B60D 1/54* (2006.01)
*B60D 1/66* (2006.01)
*B60D 1/42* (2006.01)

(58) Field of Classification Search
USPC .............................. 280/479.1; 701/25, 300
See application file for complete search history.

(56) References Cited

U.S. PATENT DOCUMENTS

| | | |
|---|---|---|
| 6,164,681 A | 12/2000 | Grammer |
| 7,690,671 B1 * | 4/2010 | Jensen ................... B60D 1/363 280/477 |
| 2002/0125018 A1 | 9/2002 | Bernhardt et al. |
| 2005/0167945 A1 | 8/2005 | Rimmelspacher et al. |
| 2006/0255560 A1 * | 11/2006 | Dietz ....................... B60D 1/36 280/477 |
| 2006/0290100 A1 | 12/2006 | Miller |
| 2006/0293800 A1 * | 12/2006 | Bauer ...................... B60D 1/36 701/1 |
| 2007/0007749 A1 | 1/2007 | Gentner et al. |
| 2007/0222183 A1 * | 9/2007 | Daniel ..................... B60D 1/52 280/479.1 |
| 2009/0236825 A1 | 9/2009 | Okuda et al. |
| 2010/0096203 A1 * | 4/2010 | Freese, V ................ B60D 1/36 180/167 |
| 2011/0216199 A1 * | 9/2011 | Trevino ................... B60D 1/36 348/148 |
| 2012/0191285 A1 * | 7/2012 | Woolf ...................... B60D 1/36 701/25 |

* cited by examiner

SYSTEM AND METHOD FOR CONNECTING OR DISCONNECTING A TRAILER TO A VEHICLE

TECHNICAL FIELD

The present invention relates to a system and method for automatically connecting a trailer to a vehicle.

BACKGROUND OF THE INVENTION

Connecting a trailer to a vehicle can be a tiresome and needlessly difficult process. In addition to connecting the trailer to the tow bar of the vehicle, it is important to connect the power cord, disconnect the parking break and raise the support wheel, if the trailer has these features. Connecting smaller trailers to the vehicle can also be strenuous, since the user often has to lift the trailer on to the tow bar.

US 20070007749 describes a coupling having a ball neck body pivoted around an axis between the operating and the rest positions. Rotation blocking bodies are placed in connection with an actuation mechanism, in order to direct the reaction forces perpendicular to the pivot axis.

US 20050167945 describes a device which is designed as a ball member to be connected to a fastener located on the trailer. The vehicle has a tow bar mounted behind the rear bumper. The coupling comprises a container fitted to a component that uses a load bearing component and slides into a locked position by means of a spring supported locking element for attaching the device in a resting or working position.

EP 1535765 describes a trailer coupling for motor vehicles which has a coupling arm with drive means acting on a rotary axis element through a rotational bearing. By means of a movement device, the mounting piece is pressed into a recess that holds the coupling to the connector housing in order to lock it therein.

All these documents describe different solutions for a tow bar that can be hidden and retrieved when you need it. The problem with these solutions is that they only have an esthetic purpose. With these solutions it is not necessary to have the tow bar protruding out from behind the vehicle when it is not in use. The attaching of the trailer to the tow bar of the vehicle is not made any easier.

SUMMARY OF THE INVENTION

The purpose of the present invention, as described in the set of claims, is to solve the problems mentioned above. The invention discloses a system and method for automatically connecting a trailer to or from a vehicle.

The solution describes a tow bar that can be hidden under a vehicle. When somebody wants to use a trailer, he or she positions the trailer and the vehicle within a working radius of each other. When the vehicle and the trailer are positioned correctly, the user activates the tow bar. According to one embodiment of the invention the tow bar moves out from underneath the vehicle. The tow bar can move in all directions and, furthermore, it can move until it connects with the trailer hitch. The design of the trailer hitch allows the tow bar to be guided into the fitting on the trailer.

When the tow bar and the trailer hitch are connected, the link between the vehicle and the trailer will automatically be locked. The parking brakes on the trailer will automatically disconnect and the support wheel will be raised. Further, you can automatically connect a pneumatic system, safety wire and electric cable. The tow bar will then automatically center itself to the driving position.

In a further embodiment, a wireless connection will provide communication between the vehicle and the trailer. The vehicle will then be able to send signals to the trailer telling it which lights should be activated.

A system for connecting or disconnecting a trailer to a vehicle is described. The system may include a trailer hitch mounted on the trailer; a tow bar mounted to the vehicle, the tow bar movable in all directions, operable to connect to the trailer hitch mounted on the trailer, having a driving position, and operable to automatically center itself for the driving position after it has been connected to the trailer hitch; at least one motor mounted in connection with the tow bar, the at least one motor operable to control the tow bar; and a control of said at least one motor; and wherein when the tow bar and the trailer hitch are positioned within a predetermined radius of one another the at least one motor is operable to cause the tow bar and the trailer hitch to automatically connect.

The system may include a device such as a proximity sensor, a camera, or a range finder for assessing the distance between the vehicle and the trailer hitch. Such a device may determine the radius within which the tow bar and the trailer hitch may automatically connect.

A parking brake or support wheel on the trailer may be automatically controlled by the system depending on whether or not the tow bar is connected to the trailer hitch. Wireless transmission of a signal from the vehicle to the trailer may provide control of the light signals on the trailer.

The system may include an interlock to prevent its activation or deactivation during driving of the vehicle.

The system may be activated or deactivated via voice control, touch screen or remote control.

A method for automatically connecting or disconnecting a trailer to a vehicle is described. The method may include providing a tow bar mounted to the vehicle, the tow bar having a driving position, the tow bar movable in all directions, and the tow bar operable to automatically center itself for the driving position after connection to a trailer hitch mounted on the trailer; providing at least one motor mounted in connection with the tow bar, the at least one motor having a control and operable to control the tow bar; providing a device operable to evaluate a distance between said vehicle and the trailer hitch mounted on the trailer, the device operable to give a signal to said control of the at least one motor when the distance between the vehicle and the trailer hitch determined by the device is within a working radius; causing the motor to engage the tow bar to connect to the trailer hitch upon receipt of the signal by the control; and allowing the tow bar to automatically center itself for the driving position after connection to the trailer hitch.

DETAILED DESCRIPTION

Figure 1:
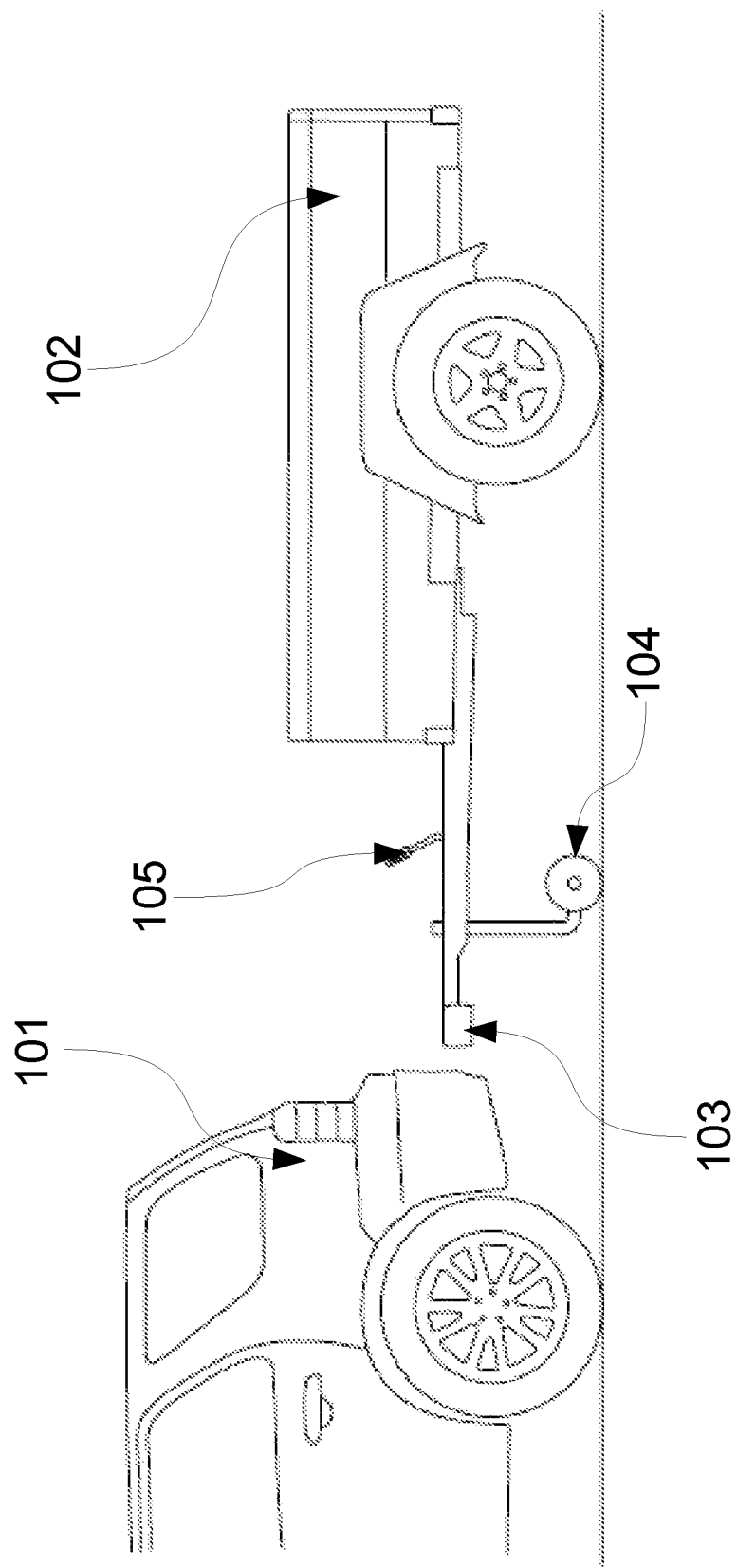
FIG. 1 is a side view image of an embodiment of the invention wherein a vehicle 101 and a trailer 102 are positioned one after the other, but where the tow bar 201 is hidden underneath the vehicle 101.

FIG. 1 is a side view image of an embodiment of the invention. To the far left of the drawing, the rear end of a vehicle 101 is shown. Behind the vehicle 101 there is located a trailer 102.

Before activating the tow bar 201 the user must ensure that the trailer 102 and vehicle 101 are positioned within a working radius of each other. When the vehicle 101 and trailer 102 are positioned within the correct radius, one can activate the tow bar 201. In one embodiment of the invention, the trailer hitch 103 may advantageously have a conical collar around the opening of the connection point. The tow bar, the trailer hitch mounted on the trailer, or both may be resilient. This is in order to make it easier to guide the tow bar 201 into place. Further a magnet can help in guiding the tow bar 201 into place.

The tow bar 201 is controlled by at least one motor 202. This at least one motor 202 can be electric, pneumatic or hydraulic. The motor 202 can be controlled either automatically by sensors, by using a remote control or by using other means of control mounted directly on the motor 202 or inside the vehicle, e.g. a button placed close to the driver.

A camera can be placed on the rear end of the car. The camera can film the area around the tow bar. This camera can be combined with a reversing camera. The image that the camera captures can be displayed on a screen inside the vehicle 101. The image displayed on the screen may have guiding lines. These guiding lines can aid in telling when the vehicle 101 and trailer 102 are positioned within the correct radius for connecting the trailer to the vehicle. The guide lines may be in the form of digitally constructed lines which are added to the images captured by the camera. Any other guiding devices could also be used.

The images captured by the camera during filming the area around the tow bar may be transmitted to a monitor mounted within the vehicle. The images may be combined to create a video. The video may be transmitted to a monitor mounted within the vehicle.

Figure 2:
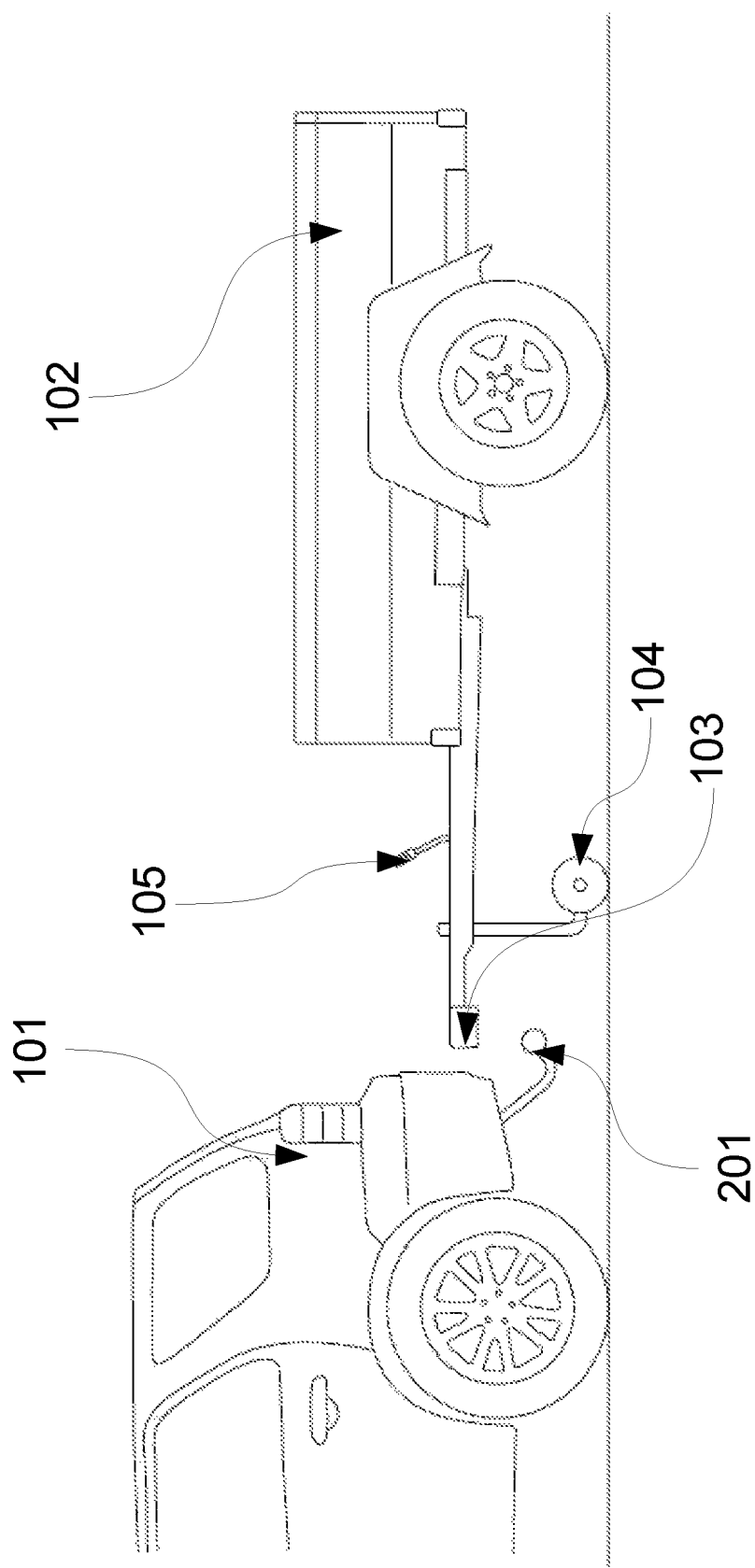
FIG. 2 is a side view image of one embodiment of the invention wherein the tow bar 201 is activated and moves out from underneath the vehicle 101.

FIG. 2 shows a side view image of one embodiment of the present invention wherein the tow bar 201 is activated and is on its way out from underneath the vehicle 101. When the tow bar 201 is not in use, it can be hidden underneath the vehicle 101. Upon activation of the tow bar 201, according to an embodiment of the present invention, it can be tilted downwards. This means that the back end of the tow bar is lowered. The tow bar can then be extended. Alternatively, either parts of, or the entire part of the tow bar 201 is moved backwards. Finally, the tow bar 201 is raised so that the hook and ball top point upward.

Figure 3:
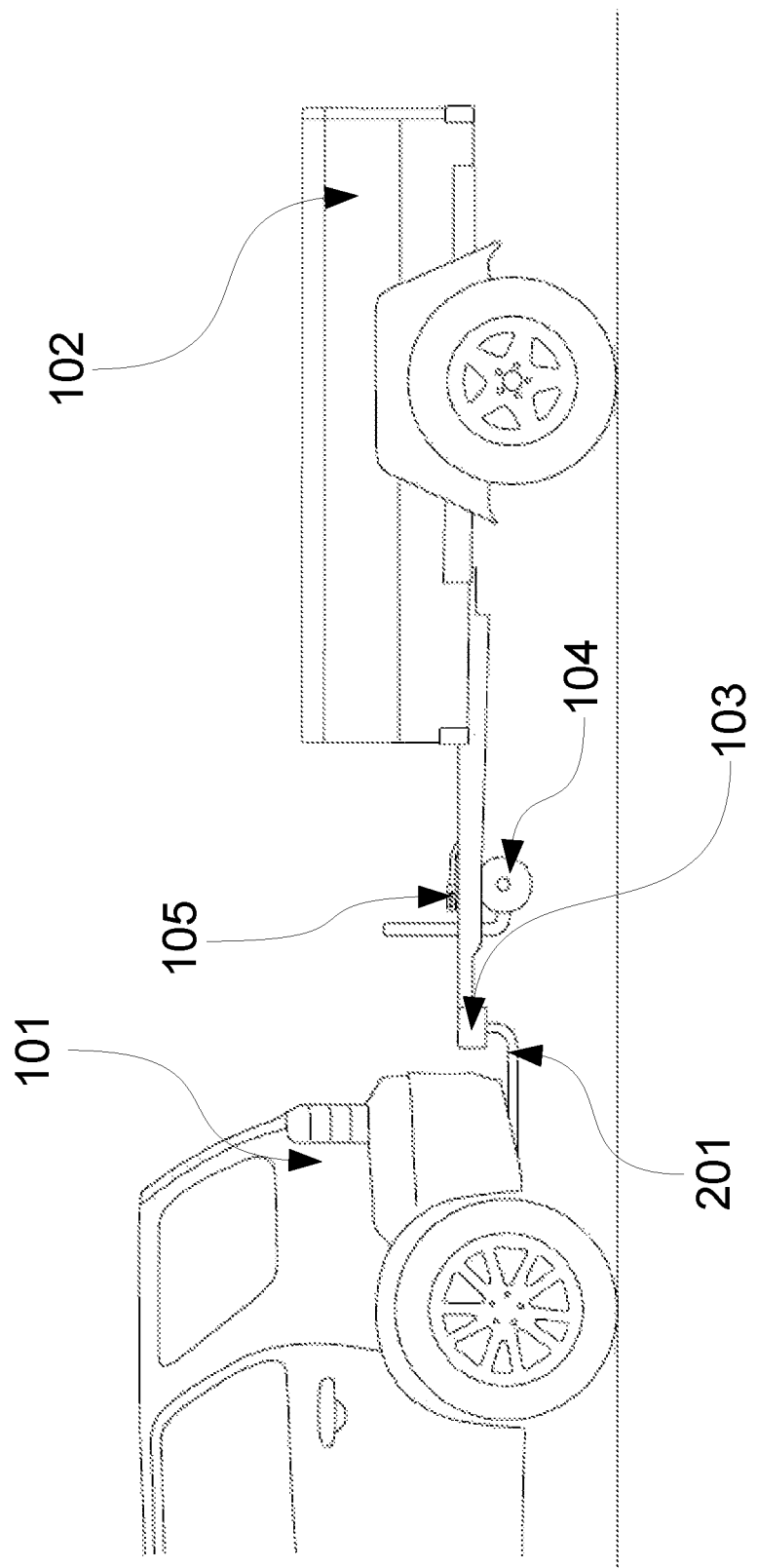
FIG. 3 is a side view image of one embodiment of the invention in which the trailer 102 is connected to the vehicle 101.

FIG. 3 shows a side view image of one embodiment of the present invention in which the trailer 102 is connected to the vehicle 101.

According to one embodiment of the invention, the support wheel 104 of the trailer 102 is raised when the tow bar 201 is attached. This feature can also be applied to support pillars if the trailer has these.

If the trailer 102 has parking brakes 105, these can be released automatically when the tow bar 201 is attached.

When disconnecting the trailer 102 from the vehicle 101, the user deactivates the tow bar 201. The procedure mentioned under the description of FIG. 2 is then reversed and the tow bar 201 again can be hidden under the vehicle.

During the disconnection process between the tow bar 201 and the trailer 102, the support wheel 104 or the support pillars of the trailer 102 are again lowered and the parking brakes 105 are activated if the trailer 102 has these features.

As a further alternative, the transmission of the control signals for controlling the lights on the trailer can be transmitted wirelessly.

Figure 4:
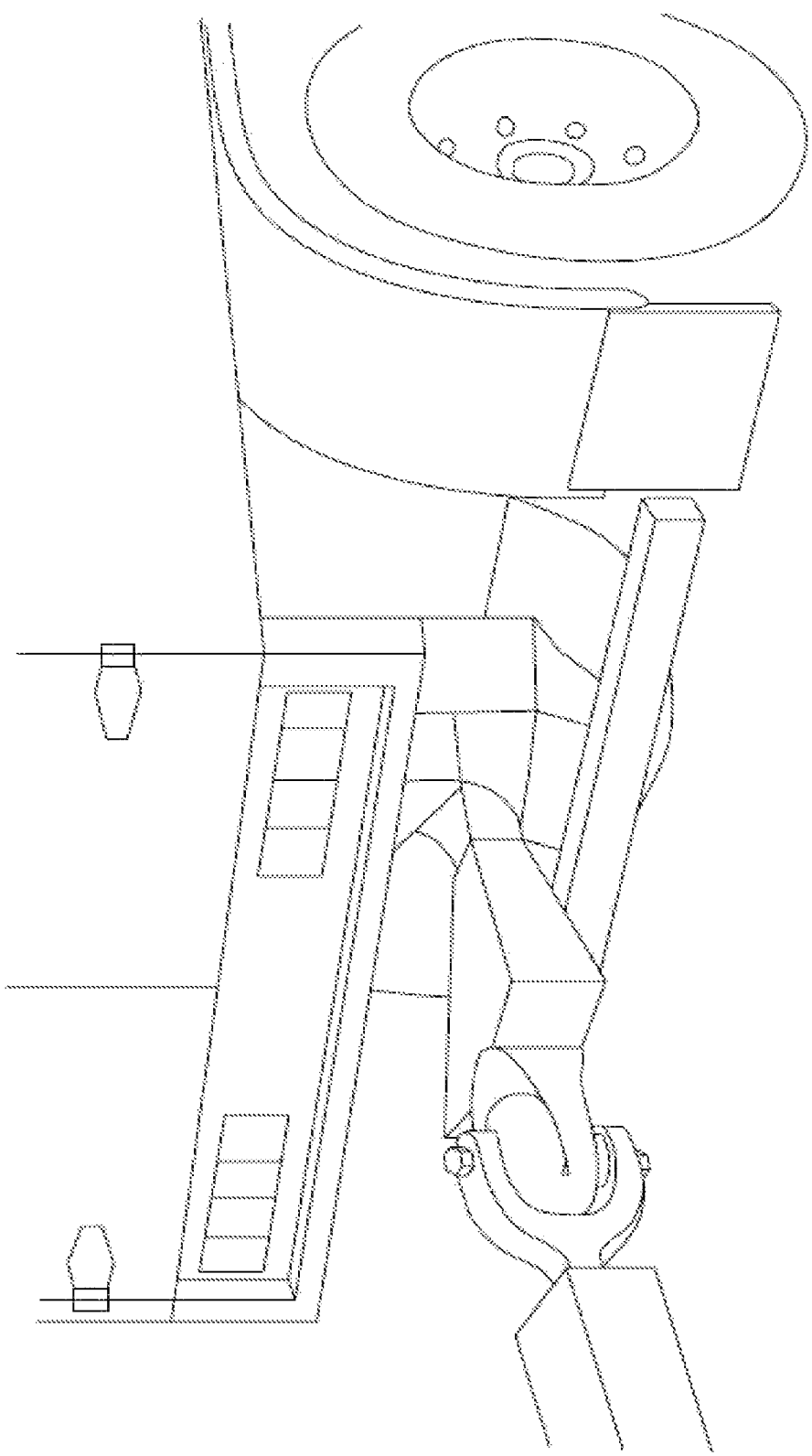
FIG. 4 is a perspective view of an embodiment of the present invention used on an articulated lorry.

FIG. 4 is a perspective view of an embodiment of the present invention used on an articulated lorry.

Figure 5:
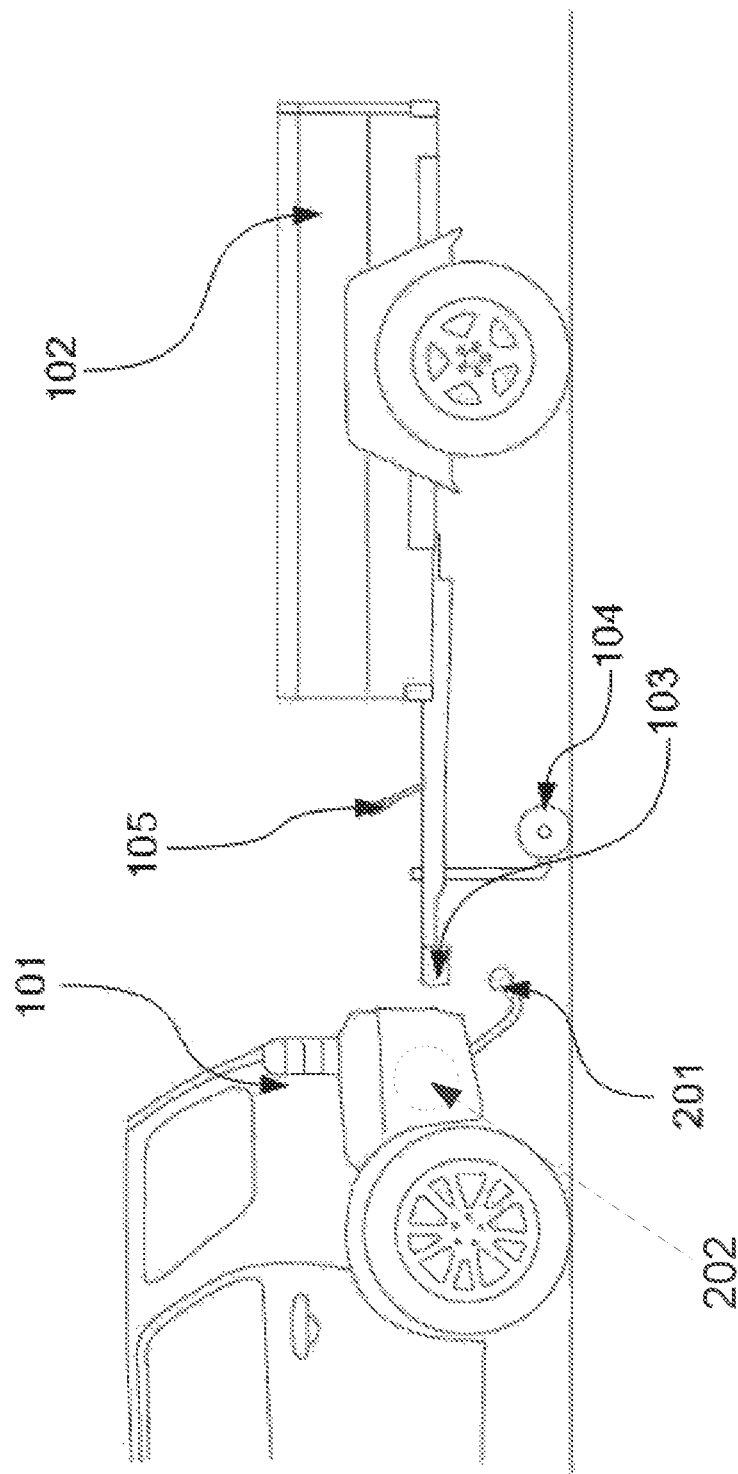
FIG. 5 is a side view image of an embodiment of the present invention wherein the motor controlling the tow bar is placed in connection to the tow bar.

FIG. 5 is a side view image of an embodiment of the present invention wherein the motor controlling the tow bar is placed in connection to the tow bar.

In an even further embodiment, the trailer hitch on the trailer 103 and/or the tow bar 201 can be magnetic. This makes it easier for the tow bar 201 to connect to the trailer hitch on the trailer 103.

The tow bar 201 can be maneuvered in all three dimensions. This allows for an easier connection to the trailer. With this feature the tow bar 201 can connect to the trailer even if they are not perfectly aligned. When the tow bar and the trailer are connected, the tow bar 201 and the trailer 103 are centered automatically in order to make ready for driving.

A further alternative is that in addition to linking the tow bar 201 and the trailer 103 together, the pneumatic cables for the trailer brakes can also be connected automatically. One can also connect the cables controlling the light signals between the vehicle and the trailer automatically. One can imagine that the coupling itself is spring-loaded and/or moving to ease the connection.

An additional action that may be made easier by the present invention is the connecting of the safety chains or security bolts. When connecting trailers to larger vehicles, such as a truck or a dumper truck, one can make use of an automatic triggering of the safety pin when the trailer and the truck or dumper truck are properly connected. A possible solution for this is to have a switch mounted on the link that is only activated when the trailer and the truck or dumper truck are properly connected. Alternatively, this can be controlled from the cabin.

For connection between regular cars and trailers with brakes, it is common to use a safety chain. The connection of this safety chain can also be done automatically. One solution could be using a safety chain that is attached to the trailer and is dropped down when the tow bar/trailer hitch are connected.

When the trailer and the vehicle are connected properly, a confirmation in the form of an audible tone, a light signal or both can be given.

A further safety feature is that the tow bar will automatically return to its original position when disconnecting the trailer.

One can also imagine that there is a reversing sensor, rangefinder or a camera attached to the trailer which is activated automatically when connecting the trailer to the vehicle. If so, this will imply that reversing sensors, rangefinder or camera found on the vehicle automatically are disabled when connected to the trailer.

The camera found on the trailer is automatically activated during reversing when the trailer is connected to the vehicle.

It would also be appropriate to consider a form of notification if there is a faulty link between the vehicle and the trailer. This could be given in the form of an audible alarm, a light signal or both.

By coupling between trailers of larger type, and a truck or a dumper truck, it would be natural to imagine a system having an automatic rising of the pillars of the trailer.

The present invention in not restricted to a specific tow bar solution, but can be used for all types of couplings between tow bars and trailers. The system can be used on both a premounted tow bar and a retrofitted tow bar.

All signals and communication in this system can either be wireless or wired.

The invention claimed is:

1. A system for connecting or disconnecting a trailer to a vehicle, the system comprising:
   a trailer hitch mounted on the trailer;
   a tow bar mounted to the vehicle,
   the tow bar movable in all directions, operable to connect to the trailer hitch mounted on the trailer, having a driving position;
   at least one motor mounted in connection with the tow bar, the at least one motor operable to control the tow bar; and
   a control of said at least one motor;
   and wherein
      when the tow bar and the trailer hitch are positioned within a predetermined radius of one another the at least one motor is operable to cause the tow bar and the trailer hitch to automatically connect by moving the tow bar to a connection position with the trailer hitch, the connection position being different than the driving position, and
      the at least one motor is operable to automatically center the tow bar for the driving position after the tow bar has been connected to the trailer hitch at the connection position.

2. The system according to claim 1 wherein said predetermined radius is determined by a device for assessing a distance between said vehicle and said trailer hitch mounted on the trailer.

3. The system according to claim 2 wherein said device for assessing the distance between said vehicle and said trailer hitch mounted on the trailer can be one or more proximity sensors.

4. The system according to claim 2 wherein said device for assessing the distance between said vehicle and said trailer hitch mounted on the trailer may be a camera mounted on a rear end of said vehicle.

5. The system according to claim 4 wherein said camera is operable to transmit video to a monitor mounted within the vehicle, the video comprising images, and on said images there are displayed guide lines.

6. The system according to claim 1 wherein an opening of the trailer hitch mounted on the trailer is conical.

7. The system according to claim 1 wherein the trailer hitch mounted on the trailer is magnetic.

8. The system according to claim 1 wherein the vehicle is operable to automatically maneuver the vehicle to a correct predetermined working radius.

9. The system according to claim 1, wherein the system can be activated or deactivated via voice control, touch screen or remote control.

10. The system according to claim 1 having an interlock, the interlock operable to prevent activation or deactivation of the system during driving of the vehicle.

11. The system according to claim 1 wherein the tow bar or the trailer hitch mounted on the trailer, or both, is resilient.

12. A method for automatically connecting or disconnecting a trailer to a vehicle, the method comprising:
   providing a tow bar mounted to the vehicle,
   the tow bar having a driving position, the tow bar movable in all directions, and the tow bar operable to automatically center the tow bar for the driving position after connection to a trailer hitch mounted on the trailer;
   providing at least one motor mounted in connection with the tow bar, the at least one motor having a control and operable to control the tow bar;
   providing a device operable to evaluate a distance between said vehicle and the trailer hitch mounted on the trailer, the device operable to give a signal to said control of the at least one motor when the distance between the vehicle and the trailer hitch determined by the device is within a working radius;
   causing the motor to engage the tow bar to connect to the trailer hitch upon receipt of the signal by the control by moving the tow bar to a connection position with the trailer hitch, the connection position being different than the driving position; and
   allowing the tow bar to automatically center the tow bar for the driving position after connection to the trailer hitch after the tow bar has been connected to the trailer hitch at the connection position.

13. The system according to claim 1 wherein the control of said at least one motor is at least one of an automatic sensor control, a remote control, a control mounted directly on the at least one motor, or a control located inside the vehicle.

* * * * *